United States Patent [19]

Poulin

[11] Patent Number: 4,565,398
[45] Date of Patent: Jan. 21, 1986

[54] MULTI-PURPOSE COMPOUND HAND TOOL

[76] Inventor: Charlemagne Poulin, 1432 Defense Hwy., Gambrills, Md. 21054

[21] Appl. No.: 659,888

[22] Filed: Oct. 11, 1984

[51] Int. Cl.$^4$ ................ A01B 1/20; A01D 11/06
[52] U.S. Cl. ............................ 294/52; 7/114; 56/400.04; 172/375; 172/378; 294/53.5; 403/92
[58] Field of Search ............... 294/51, 52, 53.5, 55.5, 294/59; 7/114–116; 56/400.04, 400.05, 400.07, 400.11, 400.16, 400.19; 172/371–375, 378; 403/92, 93, 96, 97, 101

[56] References Cited

U.S. PATENT DOCUMENTS

| 88,591 | 4/1869 | Tibbetts | 294/51 |
|---|---|---|---|
| 177,498 | 5/1876 | Gebhardt | 294/52 |
| 316,810 | 4/1885 | Niebel | 294/53.5 |
| 2,409,879 | 10/1946 | McIntosh | 403/92 |
| 2,689,155 | 9/1954 | McIntosh | 294/51 |
| 2,780,976 | 2/1957 | Koering | 172/378 |
| 3,115,359 | 12/1963 | Hendrick | 294/53.5 |
| 4,475,757 | 10/1984 | Glock | 294/53.5 X |

FOREIGN PATENT DOCUMENTS

| 308845 | 10/1918 | Fed. Rep. of Germany | 294/51 |
|---|---|---|---|
| 1157110 | 11/1963 | Fed. Rep. of Germany | 294/53.5 |
| 825425 | 12/1959 | United Kingdom | 294/53.5 |

*Primary Examiner*—Johnny D. Cherry
*Attorney, Agent, or Firm*—Brady, O'Boyle & Gates

[57] ABSTRACT

A compound garden type or agricultural tool having a handle which is adapted to be fitted to a blade type of implement which is angularly adjustable for use as a spade, shovel or hoe and a fork type implement which is similarly adjustable. Additionally, the fork is adapted to be fitted with a pronged attachment which converts the fork into a rake. The adjustability feature comprises an angulated shoulder surface on the blade and fork type implements and having a projection which is operable to cooperate with a recess and a flat surface in the handle for establishing a straight, inclined, and right angled position for the particular implement engaging the handle.

12 Claims, 8 Drawing Figures

U.S. Patent   Jan. 21, 1986   Sheet 1 of 2   4,565,398
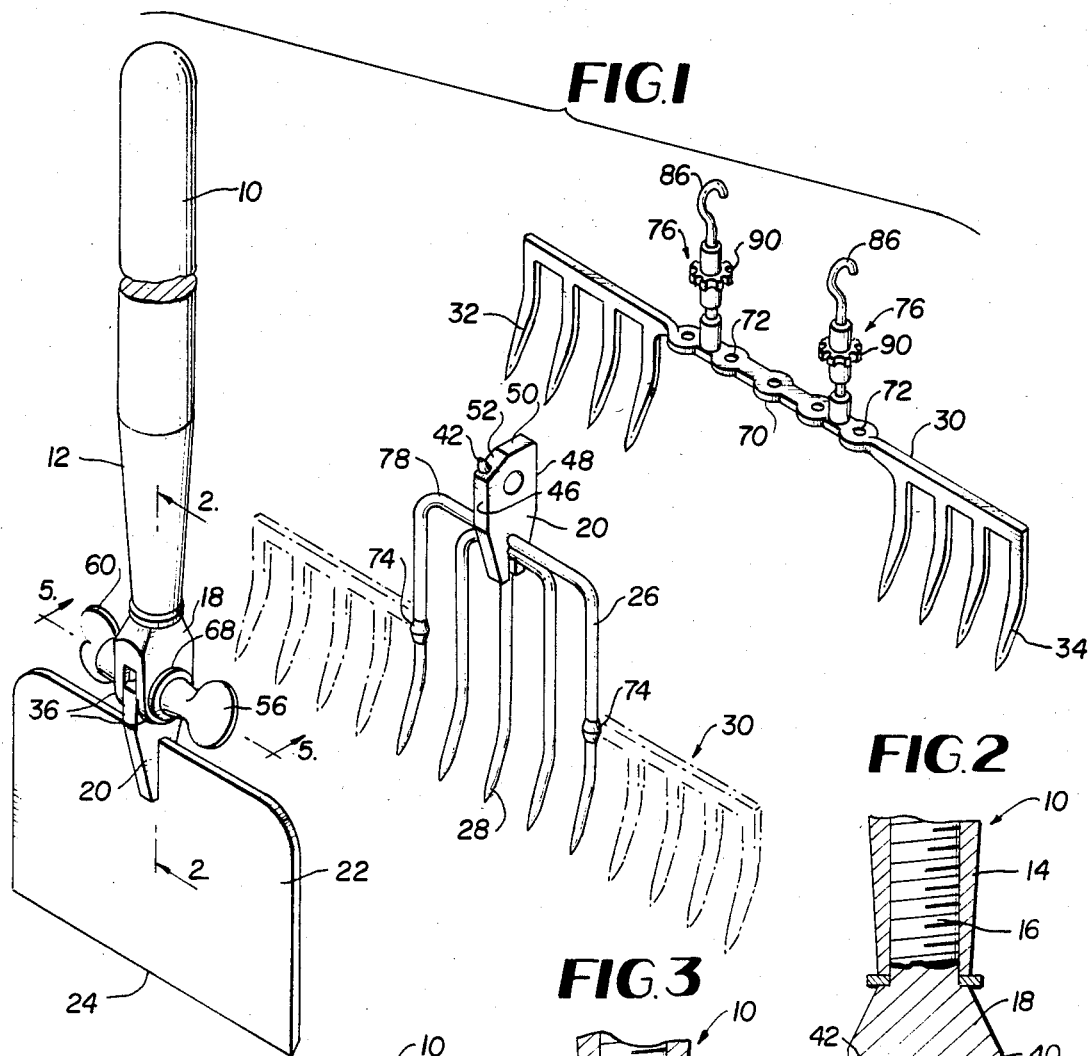
FIG.1
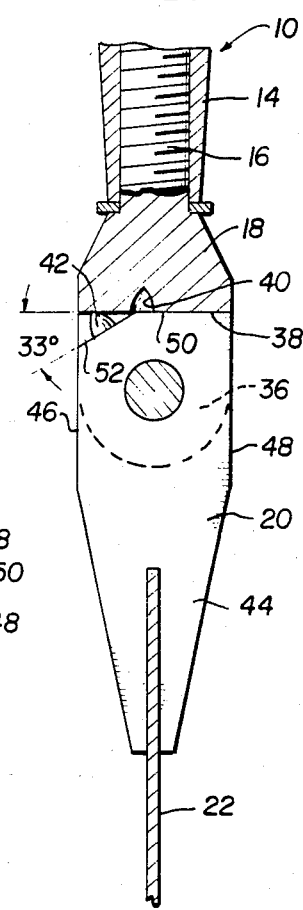
FIG.2
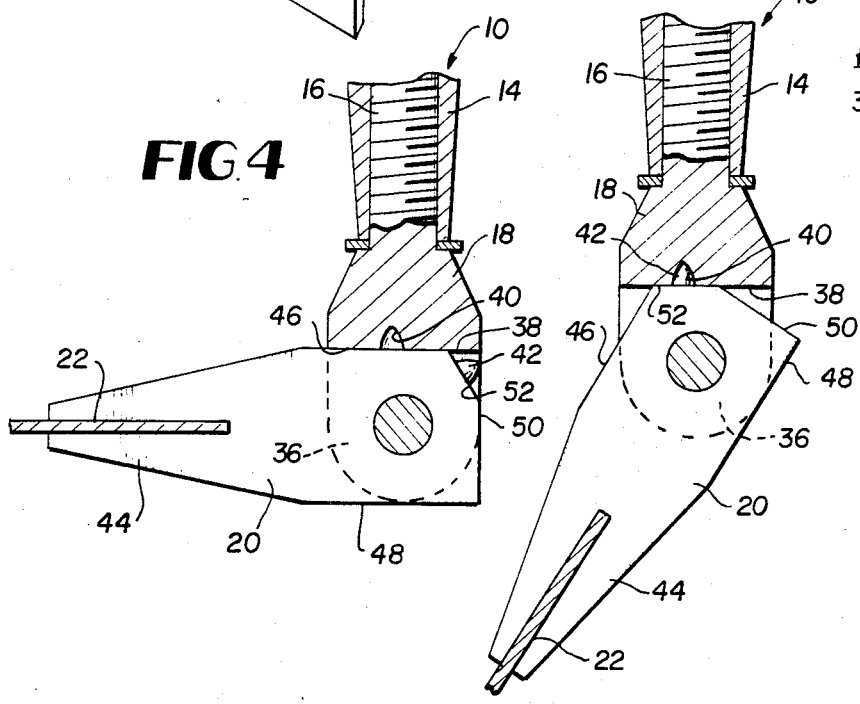
FIG.3
FIG.4

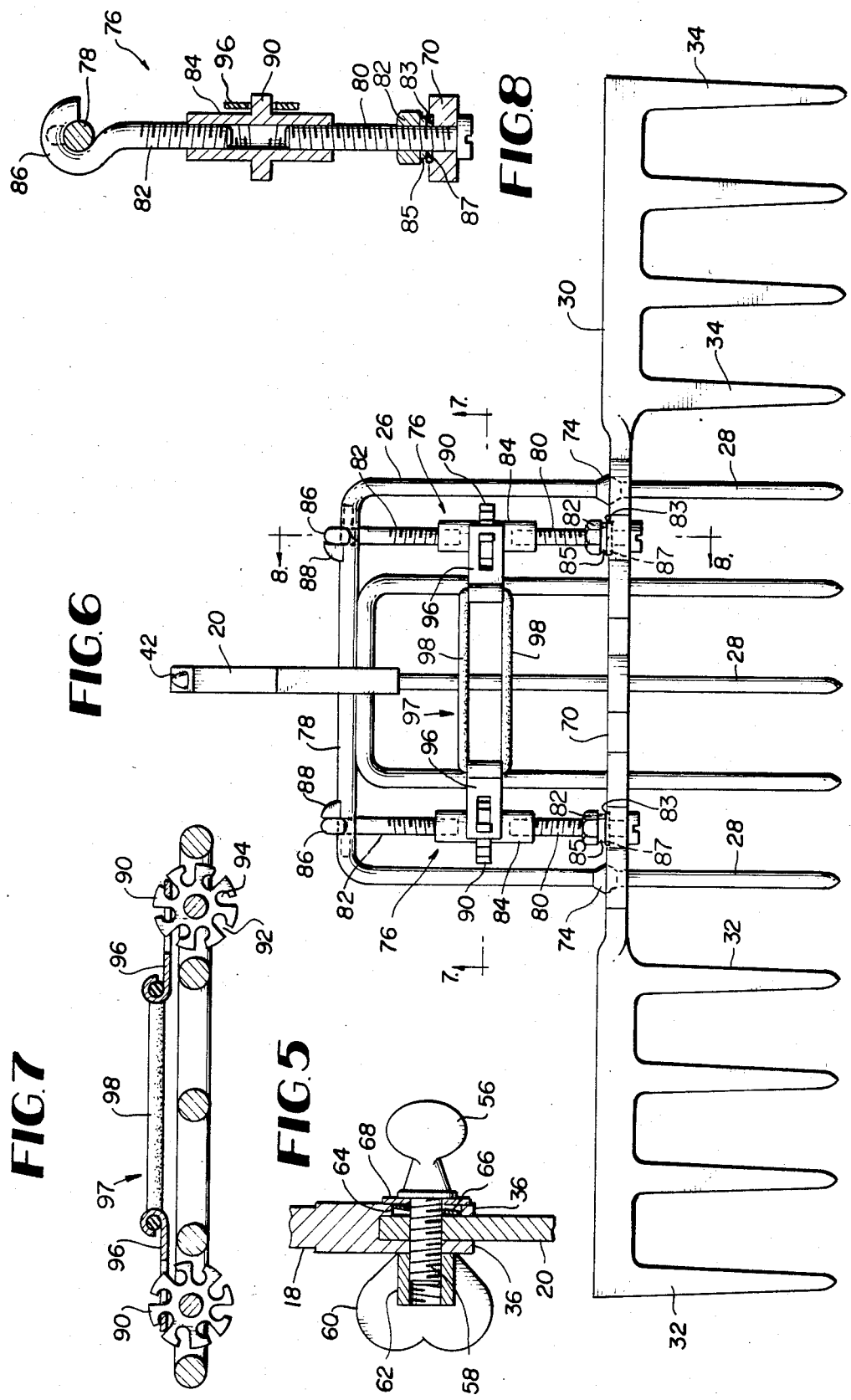

MULTI-PURPOSE COMPOUND HAND TOOL

BACKGROUND OF THE INVENTION

This invention relates generally to multi-purpose tools and more particularly to a compound tool whereby several different types of implements such as a blade or fork are connectable to a common handle and being angularly adjusted thereon to provide a set of tools with a minimum number of parts.

Compound tools consisting of one or more different types of tools which may or may not be adjustably fitted to a single handle are well known. Typically, such apparatus comprises a combination of a hoe, pick and shovel utilized for such tasks as gardening. It is also known to include an implement such as a rake or fork in the combination and having means for interchangeability with the other components.

It is an object of the present invention, therefore, to provide an improvement in the art of combination type tools.

It is a further object of the invention to provide an improvement in multi-purpose hand tools having a plurality of agricultural type implements connectable to a single handle.

It is still another object of the invention to provide an improvement in the mechanical connection between a handle and a plurality of hand tools.

It is still another object of the invention to provide an improvement in the means for combining two separate implements on a common handle for converting the tool from one type to another.

SUMMARY

The foregoing and other objects are achieved by the utilization of a compound garden type tool having a handle which is adapted to be fitted to a plurality of components including a blade type implement which can be angularly adjusted for operation as either a spade, shovel or a hoe and a second type of implement namely a pronged type implement, such as a fork, which is similarly adjustable and engageable with another pronged implement which converts the fork into a rake. The adjustability of the various implements comprises a shoulder surface configuration including one angulated surface having a projection which is operable to cooperate with a recess in an inner flat surface in the handle for establishing any one of three fixed positions of the particular implement engaging the handle. Furthermore, the fork and attachment therefor includes a hold down unit comprised of two turnbuckles including manual rotator means which are interconnected and held stationary by an elastic retainer clip.

DESCRIPTION OF THE DRAWINGS

While the present invention is defined in the claims annexed to and formed a part of this specification, a better understanding can be had by reference to the following description when taken in conjunction with the accompanying drawings in which:

FIG. 1 is a perspective view of the set of implements included in a preferred embodiment of the invention;

FIG. 2 is a partial cross sectional view of one tool member connected to the handle for use in a first mode of operation, and being taken along the lines 2—2 of FIG. 1;

FIG. 3 is a cross sectional view of the implement shown in FIG. 2 adjusted for use in a second mode of operation;

FIG. 4 is a perspective view of the implement shown in FIG. 2 adjusted for use in yet a third mode of operation;

FIG. 5 is a sectional view taken along the lines 5—5 of FIG. 1;

FIG. 6 is a front plan view of a combination of the two pronged type members shown in FIG. 1;

FIG. 7 is a cross sectional view of the assembly shown in FIG. 6 taken along the lines 7—7 thereof; and FIG. 8 is a sectional view of the assembly shown in FIG. 6 taken along the lines 8—8 thereof.

DETAILED DESCRIPTION OF THE PREFERRED EMBODIMENT

Referring now to the drawings and more particularly to FIG. 1, reference numeral 10 denotes an elongated handle which includes a tapered end portion 12 having a threaded bore 14 as shown in FIGS. 2-4 for receiving the threaded shank portion 16 of a bifurcated coupling element 18 which is adapted to engage identical connecting members 20 contained on at least two different types of tool implements, one of which comprises a blade type member 22 having an elongated cutting edge 24 and the other comprising a fork type member 26 having a plurality of elongated prongs or tines 28. As will be explained subsequently, an attachment 30 having two outer sets of relatively shorter prongs 32 and 34 separated by the span of the tines 28 of the implement 26 is adapted to be fitted onto the fork 26 as shown in phantom view in FIG. 1 for converting a pitchfork, for example, into a rake.

Turning attention now to connection of the implements 22 and 26 to the bifurcated coupling element 18 attached to the handle 10, the coupling element 18 includes a pair of rounded end portions 36 (FIG. 1) which inwardly terminate at a flat inner wall surface 38 as shown in FIGS. 2-4 which includes a relatively small dimpled recess 40 which is slightly offset from the central longitudinal axis of the handle and is adapted to engage a like shaped projection 42 of the block type connecting element 20 located both on the blade type implement 22 and the fork type element 26. The connecting block element 20 while including a narrowed body portion 44 which engages either implement 22 or 26 additionally includes a pair of opposing parallel side surfaces 46 and 48, a top surface 50 which is at right angles to the side surfaces 46 and 48 and a relatively short angulated surface 52 between the surfaces 46 and 50 containing the projection 42. The surface 52 is selectively inclined at an angle of 33° with respect to the upper surface 50.

As shown in FIG. 2, when the top surface 50 of the connector element 20 abuts the inner surface 38 of the bifurcated coupling element 18, the plane of the blade 22, for example, is in a straight line with the handle 10 thus providing a tool which can be used either as a spade or a scraper. It should also be pointed out that the angulated surface 52 permits the projection 42 to fit within the end portions 36 without being obstructed by the inner surface 38. Next as shown in FIG. 3, by positioning the connector element 20 such that the inclined surface 52 abuts the inner surface 38 the blade implement 22 is now tilted at an angle of 33° relative to the vertical or central axis of the handle 10 so that there is provided a tool which is adapted to function as a shovel, for example. With respect to the arrangement shown in FIG. 4, the side surface 46 is made to engage the inner surface 38 so that the blade implement 22 is at a right angle with respect to the handle 10 and thus a tool is provided which is adapted to function as a hoe. It is also worthy to note that the angulated surface 52 resides within the confines of the end portions 36 of the bifurcated element 18 so that the projection 42 still fits within the confines of the bifurcated element 18 while not obstructing the surface 38 in the same manner as shown in FIG. 2, but now reversed.

Both the blade type member 22 and the fork type member 26 are secured in any of its variable positions on the handle 10 such as shown in FIGS. 2-4 by means of a winged nut and bolt assembly as shown in FIG. 5. There a winged bolt 56 having a threaded shank 58 engages a winged nut 60 having a threaded bore 62. One of the end portions 36 of the bifurcated member 18 further includes an enlarged circular opening 64 which is adapted to accommodate a split washer 66. A flat washer 68 is further fitted onto the bolt 56 against the split washer 66 for stability.

Referring now to FIGS. 6 through 8, shown therein is the means by which the fork type implement 26 and the attachment 30 therefor are combined. The attachment member 30 as shown in FIGS. 1 and 6 includes a relatively flat bar type connection 70 between the two sets of relatively shorter prongs or tines 32 and 34 and having five equally spaced holes 72 (FIG. 1) through which pass the five prongs or tines 28 of the fork type implement 26 as shown in FIG. 6. The two outermost prongs 28 of the fork contain stops 74 for making the length of the prongs 28 extending below the bottom of the bar 70 equal to the length of the two sets of prongs 32 and 34.

The attachment implement 30, moreover, contains two identical hold down units 76 which comprise manually operable assemblies that couple to an outer cross member 78 of the fork type implement 26. The two hold down assemblies 76 resemble turnbuckles in that each is comprised of a pair of thin threaded rod type elements 80 and 82 which engage and extend outwardly from a tubular type threaded coupling member 84 which is operable to draw the two elements 80 and 82 together when turned. The bottom or head end of the elements 80 which are comprised of flat headed bolts are secured to the connection bar 70 by suitable hardware including a lock nut 82, an O-ring and an O-ring retainer member 85. The O-ring 83 fits within a shallow recess 87 countersunk in the upper surface of the bar 70. This provides an added flexibility in connecting the elements together and prevents dust and dirt from accumulating in the bore through which the bolts 80 pass. The opposite extremity of the upper elements 82 terminate in hooks 86 which are adapted to engage the cross member 78 while abutting a pair of raised guides 88 located on the outer portions thereof.

Additionally, the threaded coupling element 84 of each of the work hold down units 76 includes a circular disk type of element 90 having a plurality of equally spaced curved projections or fingers 92 having rounded inner portions 94. The angular separation between the projections 92 is typically 45° and each is adapted to engage apertured metal tabs 96 of a retaining clip 97 as best shown in FIG. 6 and which also includes an elastic band 98. The clip 97, when in place, operates to prevent any rotation of the coupling member 84 of the hold down assembly which locks the attachment implement 30 in place on the fork type implement 26 to provide a rake type configuration.

The fork 26 and when desirable, the attachment 30 can be mounted on the handle 10 and angularly adjusted in the same manner as the blade 22 as shown in FIGS. 2, 3 and 4, depending upon the specific need at hand. While the single implement 26 oriented in a vertical position such as shown in FIG. 2 provides a tool which functions as a pitchfork, angulating the implement 26 as shown in FIGS. 3 or 4 provides a tool in the form of a narrow rake; however, with the addition of the rake type attachment 30 thereto, a conventional rake is provided which would be normally oriented in the position as shown in FIG. 4.

Thus what has been shown and described is a multipurpose compound hand tool having a plurality of implements which can be secured to and angularly adjusted on a single handle and including common connection means including right angled surfaces separated by an inclined surface having a projection which is operable to cooperate with a recess in a flat surface in the handle assembly for establishing a fixed angulated position relative to a straight and right angled position of the tool implement on the handle.

Having thus shown and described what is at present considered to be the preferred embodiment of the invention, the same has been made by way of illustration and not limitation. Accordingly, all modifications, alterations and changes coming within the spirit and scope of the invention as defined in the appended claims are herein meant to be included.

I claim:

1. A multi-purpose compound hand tool, comprising:
a handle terminating at one end in bifurcated coupling means including a substantially flat inner surface adjacent a pair of opposing end portions, said flat inner surface being perpendicular to the longitudinal axis of the handle and including a single dimple type of recess which is offset from said longitudinal axis,
a plurality of implements selectively attachable to said handle, each implement including a like connecting member having a solid body portion of a constant relatively thin thickness which fits between said pair of opposing end portions of said bifurcated coupling means, said body portion additionally having generally flat, mutually perpendicular top and side body surfaces separated by a relatively shorter intermediate generally flat inclined body surface, and defining an acute angle less than 45° with said top surface, said flat surfaces being selectively positioned to abut and be held in a fixed position against said flat inner surface of said bifurcated coupling means providing thereby adjustment of the angle of a particular said implement relative to the handle, and with said inclined body surface including a single nub type of projection engageable with said dimple type of recess in an inclined position of said implement on said handle and further having a height so as to freely fit beneath said flat inner surface of said bifurcated coupling means in both a vertical and horizontal position of said implement on said handle out of engagement with said dimple type of recess.

2. The hand tool as defined by claim 1 wherein said acute angle is substantially equal to 33°.

3. The hand tool as defined by claim 1 wherein one of said plurality of implements comprises a blade type implement whereby a selected position having said top body surface of said like connecting member abutting said inner surface of said bifurcated coupling means provides a spade or scraper type hand tool, whereby said inclined body surface of said like connecting member abutting said inner surface of said bifurcated coupling means provides a shovel type hand tool, and whereby said side body surface of said like connecting member abutting said inner surface of said bifurcated coupling means provides a hoe type hand tool.

4. The hand tool as defined by claim 1 wherein one of said plurality of implements comprises a pronged type implement.

5. The hand tool as defined by claim 4 and additionally including another pronged type implement attached to said first recited pronged type implement for converting a first type implement to a second type implement.

6. A compound hand tool, comprising:
   a handle terminating at one end in bifurcated coupling means including a substantially flat inner contact surface adjacent a pair of opposing end portions, said flat inner contact surface being perpendicular to the longitudinal axis of the handle and including a relatively shallow recess at a predetermined location along said contact surface;
   a first pronged type implement having a first set of tines and including a connecting member having a body portion of constant thickness which fits between said pair of opposing end portions of said bifurcated coupling means, said body portion additionally having generally flat, mutually perpendicular top and side body surfaces separated by an intermediate generally flat inclined body surface, said surfaces being selectively positioned to abut and be held in a fixed position against said inner contact surface of said bifurcated coupling means to provide selective adjustment of the angle of said first implement relative to the handle;
   means for securing the connecting member of said first implement in a fixed selected position on the bifurcated coupling means of the handle;
   a second pronged type implement fittable over said first pronged type implement for providing another tool configuration, and including a second and third set of tines separated by a distance at least equal to the distance spanning said first set of tines and connected by a bar having a number of holes equal to the number of tines in said first pronged type implement such that when said first pronged type implement is inserted through the holes of said bar, the tines of said second pronged type implement are located outwardly of the tines of said first pronged type implement and generally in alignment therewith; and
   means for securing said first pronged type implement to said second pronged type implement together, said securing means further comprising at least one hold down unit comprised of a pair of opposing threaded rod members and a rotatable threaded coupling member interconnecting said threaded rod members and being operable to draw said rod members together when rotated, and wherein one of said rod members is fixedly attached at an end to said first pronged type implement and the other said rod member includes an end portion engageable with said second pronged type implement, whereby turning of the said coupling member operates to draw the two rod members toward one another and thus holding said first and second implements together.

7. The hand tool as defined by claim 6 and additionally including a second like hold down unit located a predetermined distance away from the first recited hold down unit.

8. The hand tool as defined by claim 7 and wherein the respective coupling members additionally each include a generally circular coaxial member having a plurality of equally spaced radial projections extending therefrom, and additionally including means extending between projections of the circular members for preventing undesired rotation of the coupling members.

9. The hand tool as defined by claim 8 when said extending means comprises an elastic means.

10. The hand tool as defined by claim 9 wherein said elastic means comprises a clip including a pair of apertured end members connected by a stretchable band member.

11. The hand tool as defined by claim 6 wherein the length of the tines of said first pronged type implement is greater than the length of the tines of said second pronged type implement and wherein the tines of said first pronged type implement include stop means for abutting said bar for making the ends of all said tines terminating at a common distance away from said bar.

12. The hand tool as defined by claim 11 wherein said first pronged type implement comprises a fork type element and said second pronged type implement when fitted to said fork type element converts the tool into a rake type configuration.

* * * * *